United States Patent [19]
Thore

[11] Patent Number: 5,579,914
[45] Date of Patent: Dec. 3, 1996

[54] CAMPER KITCHEN CADDY

[76] Inventor: Scott Thore, 12121 Briarlake Manor, Oklahoma City, Okla. 73170

[21] Appl. No.: 548,090

[22] Filed: Oct. 25, 1995

[51] Int. Cl.⁶ ..................................................... A45C 11/20
[52] U.S. Cl. ........................................... 206/542; 206/546
[58] Field of Search ..................................... 206/541, 542, 206/546, 543, 544, 545, 547; 190/1, 15.1; 150/106

[56] References Cited

U.S. PATENT DOCUMENTS

| | | | |
|---|---|---|---|
| 3,171,700 | 3/1965 | Parsell et al. | 206/541 |
| 3,489,267 | 1/1970 | Carpenter | 206/4 |
| 4,706,817 | 11/1987 | Greathouse | 206/546 X |
| 5,188,234 | 2/1993 | Fukuda et al. | 206/541 |
| 5,257,509 | 11/1993 | Harris | 206/546 X |
| 5,261,560 | 11/1993 | Wang | 220/735 |

*Primary Examiner*—Jacob K. Ackun
*Attorney, Agent, or Firm*—Joseph N. Breaux

[57] ABSTRACT

A camping kitchen caddy comprising a carrying case having first and second pivotally connectable case members and a pivotally connectable chopping board securable to the second case member. The carrying case includes a suit case type handle and a pair of latching mechanism for securing the first and second case members into a closed suitcase type configuration. The first and second case members are preferably molded from a plastic material and each case member includes at least one compartment form fitted to receive and hold a particular type item and a number of other compartments for receiving a variety of user selected items. The case member preferably includes a compartment form fitted to receive a frying pan and a compartment form fitted to receive a coffee pot.

3 Claims, 4 Drawing Sheets

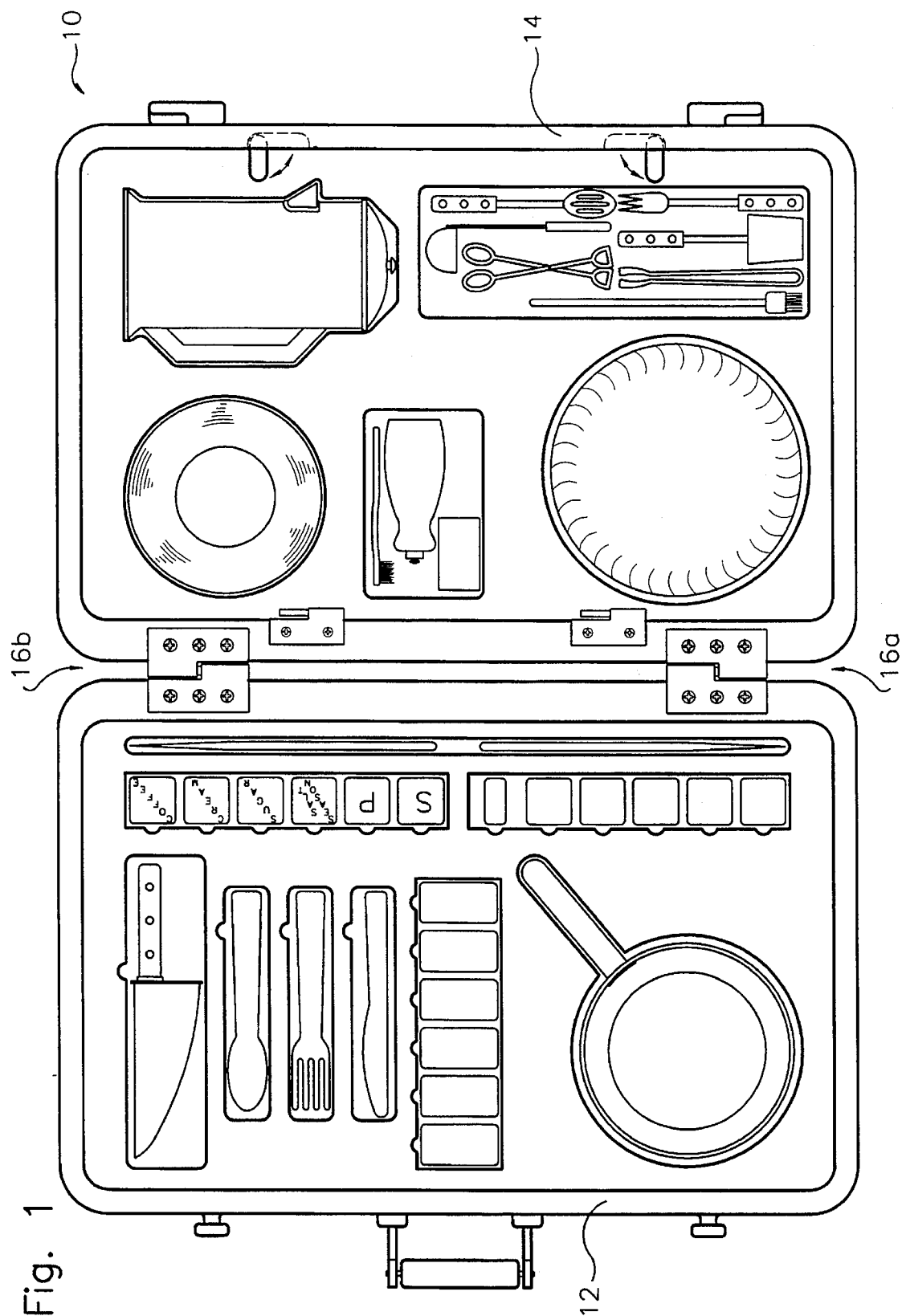

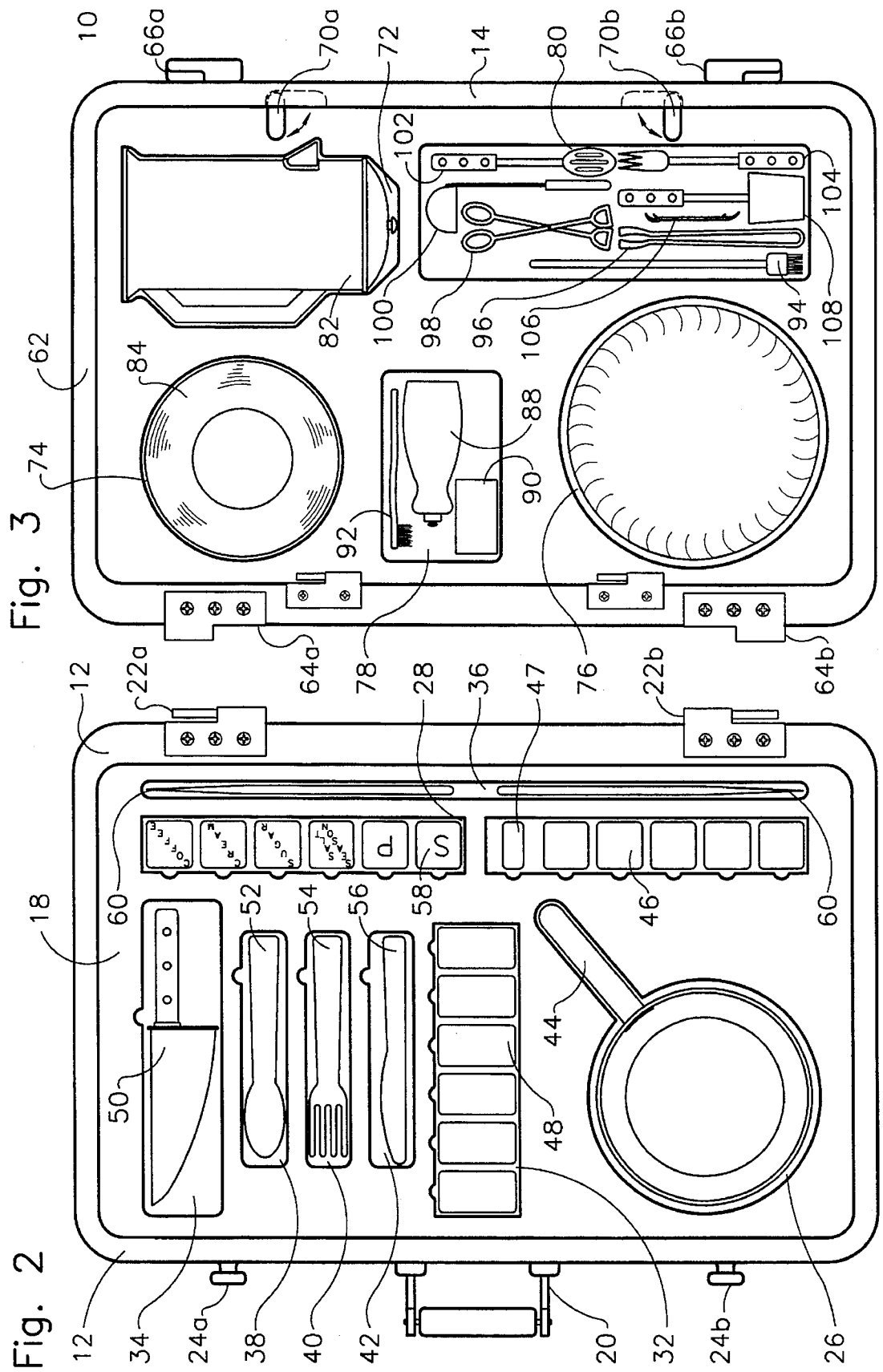

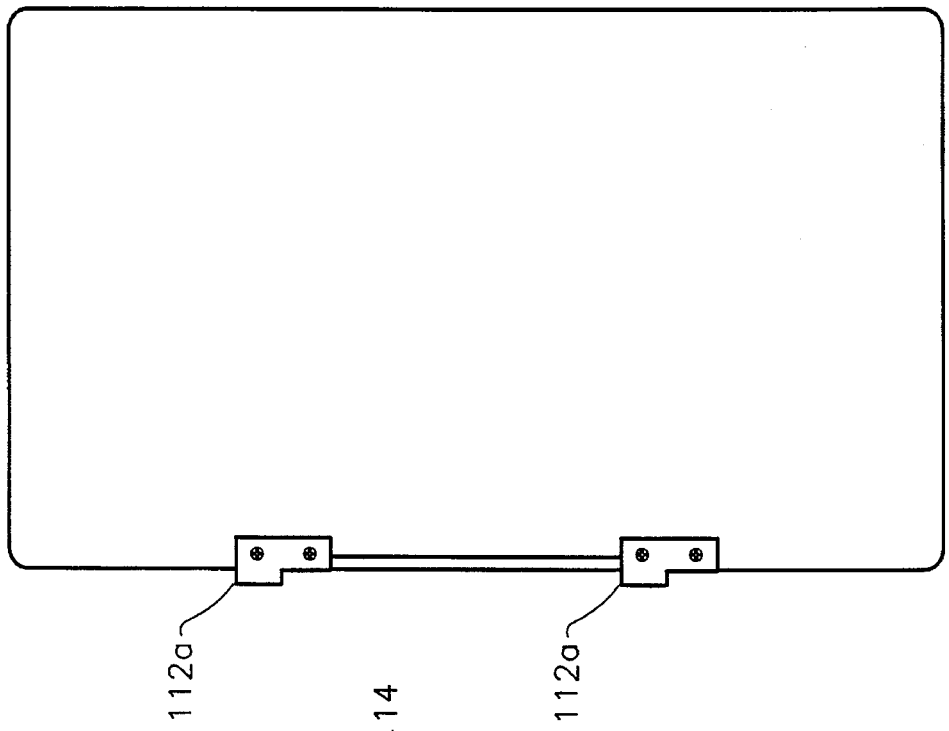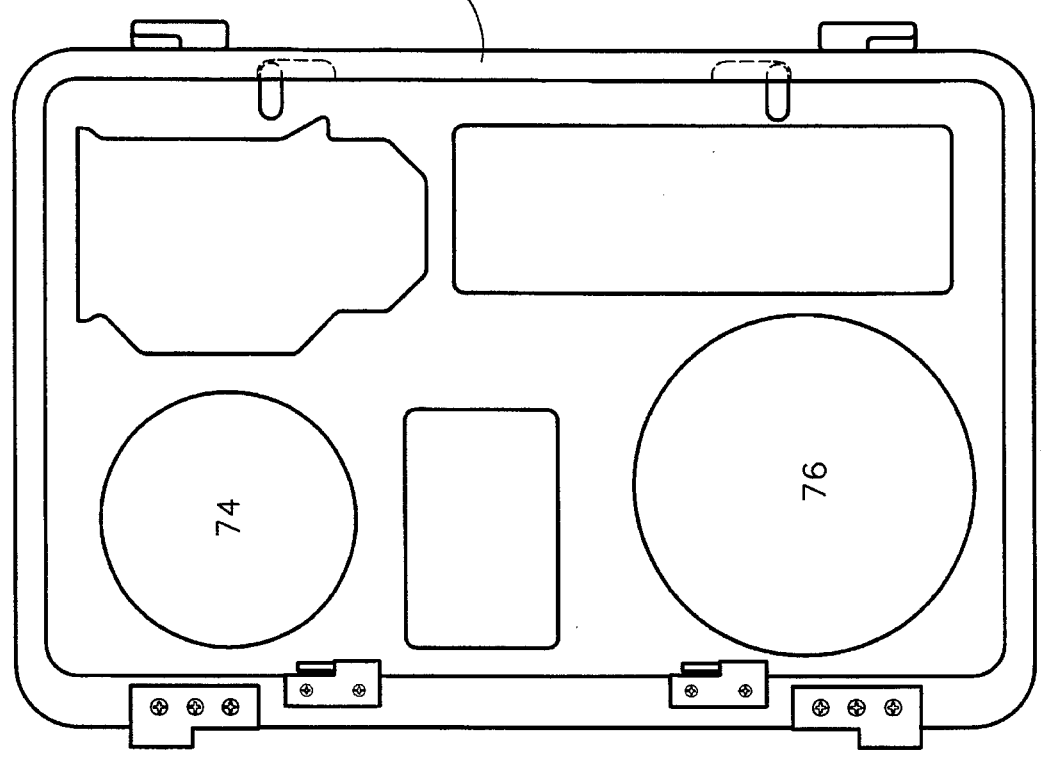

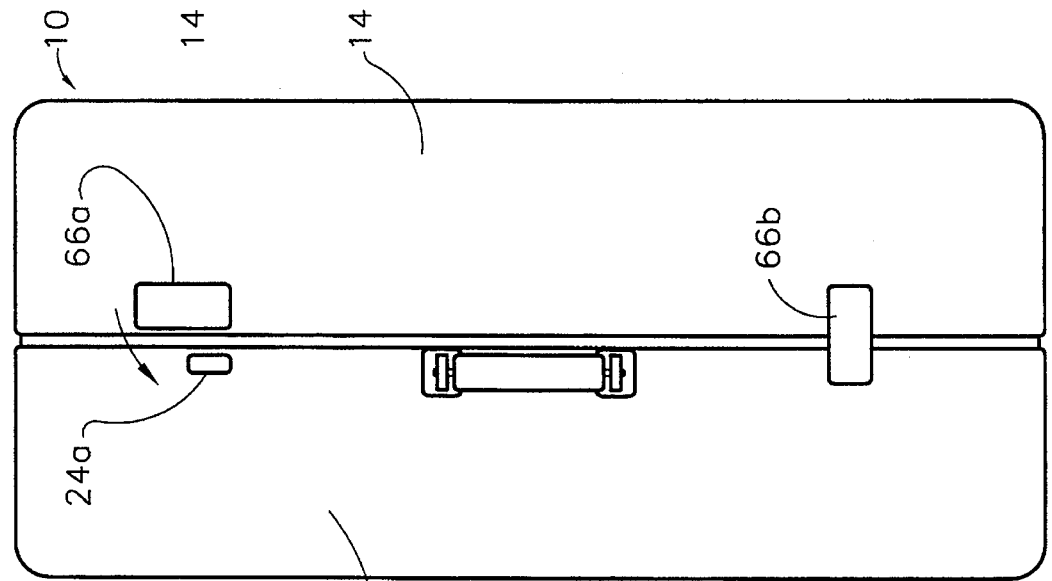
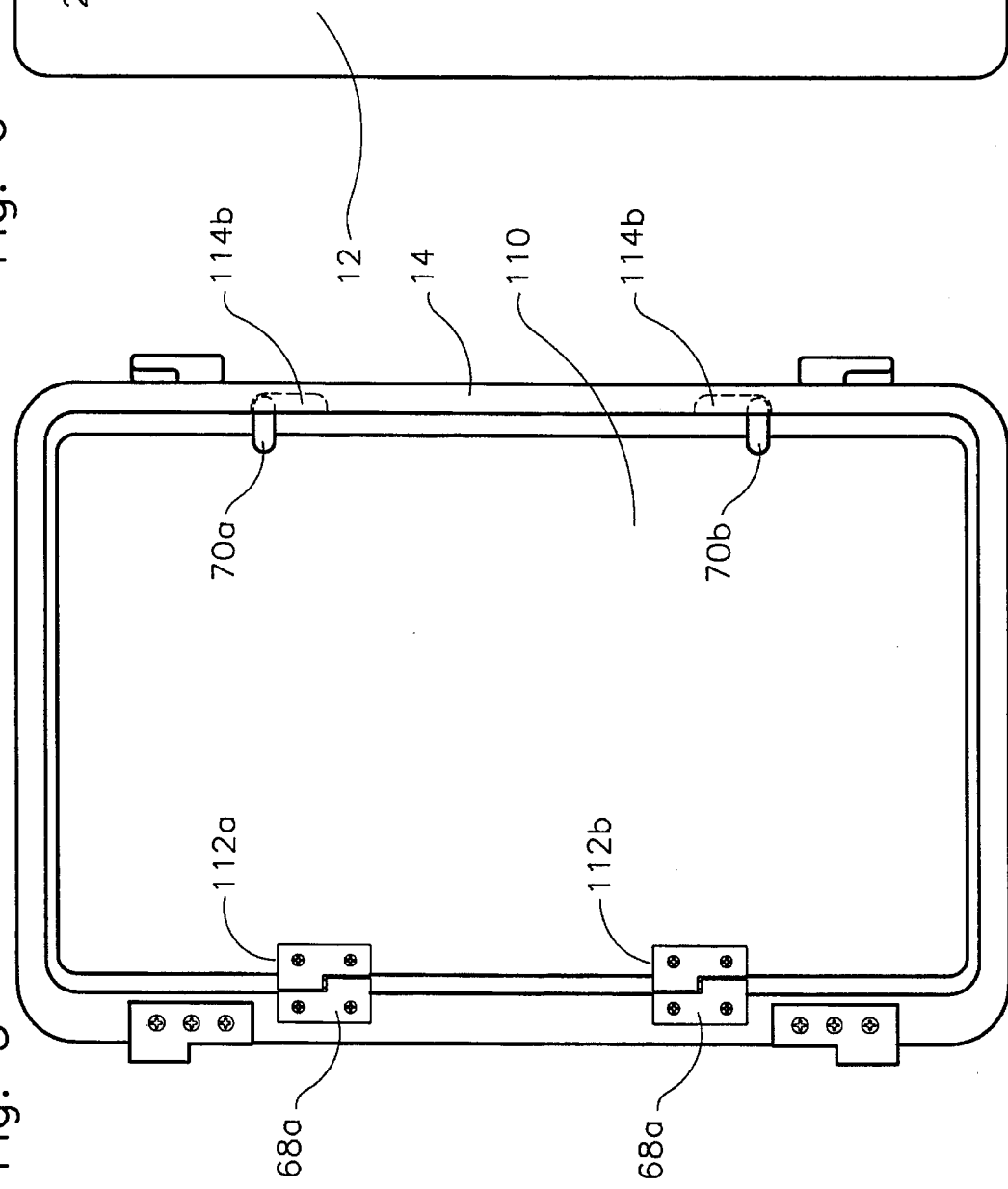

5,579,914

CAMPER KITCHEN CADDY

DESCRIPTION

1. Technical Field

The present invention relates to devices for transporting a variety of items to and from a camping or picnic area and more particularly to a device for transporting a variety of cooking, eating and cleaning utensils to and from a camping or picnic area.

2. Background Art

Assembling and transporting the myriad eating, cleaning and cooking utensils that are needed on camping trips or picnics can be time consuming and aggravating. Necessary or important items are invariably left behind either at home or the camping or picnic area. It would be desirable, therefore, to have a caddy device that included a variety of storage and transportation compartments for a variety of cooking, eating and cleaning utensils. In particular, it would be desirable to have a compartment for storing and transporting a number of coffee mugs that included special provisions for protecting the handles of the mugs from breakage. It would be a further benefit if the device were easily stored in a trunk of an automobile when not in use and easily carried from the automobile to the camping or picnic site. It would also be desirable if the device included a variety of the most commonly desired eating, cooking and cleaning utensils used while camping or picnicking.

GENERAL SUMMARY DISCUSSION OF INVENTION

It is thus an object of the invention to provide a camper kitchen caddy that includes a variety of storage and transportation compartments for a variety of cooking, eating and cleaning utensils.

It is a further object of the invention to provide a camping kitchen caddy that includes a compartment for storing and transporting a number of coffee mugs that includes provisions for protecting the handles of the mugs from breakage.

It is a still further object of the invention to provide a camping kitchen caddy that is easily stored in a trunk of an automobile when not in use.

It is a still further object of the invention to provide a camping kitchen caddy that includes a variety of the most commonly desired eating, cooking and cleaning utensils used while camping or picnicking.

It is a still further object of the invention to provide a camper kitchen caddy that all or some of the above objects in combination.

Accordingly, a camping kitchen caddy device is provided. The caddy comprises a carrying case having first and second pivotally connectable case members and a pivotally connectable chopping board securable to the second case member. The carrying case includes a suit case type handle and a pair of latching mechanism for securing the first and second case members into a closed suitcase type configuration.

The first and second case members are preferably molded from a plastic material and each case member includes at least one compartment form fitted to receive and hold a particular type item and a number of other compartments for receiving a variety of user selected items. The case member preferably includes a compartment form fitted to receive a frying pan and a compartment form fitted to receive a coffee pot. Each carrying case also includes a coffee mug receiving compartment including a first concave portion sized sufficiently to receive the drinking vessel portion of the coffee mug and a number of handle receiving concave portions, formed in the bottom of and spaced along the length of the first concave portion, that are sized sufficiently to receive the handle of a coffee mug and shield the handle from contact with other coffee mugs stored within the same first concave portion.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a top view of an exemplary embodiment of the carrying case of the camping kitchen caddy of the present invention including a variety of camping and kitchen items stored in a variety of compartments formed in the first and second case members.

FIG. 2 is a top view of the first case member of the carrying case of FIG. 1 showing the male portion of the inteconnectable hinge assembly, the handle, a form fitted frying pan receiving compartment and the coffee mug receiving compartment.

FIG. 3 is a top view of the second case member of the carrying case of FIG. 1 showing the male portion of the inteconnectable hinge assembly, a pair of latching mechanisms, a form fitted coffee pot receiving compartment, and a pair of male interconnectable hinge portions extending into the second case member for connection with an embodiment of the cutting board of the camping kitchen caddy.

FIG. 3A is a top view of the second case member showing a pair of spring load retaining pins pivotally connected to retain the cutting board in connection with the second case member and the wash and rinse compartments with the plates and bowls removed.

FIG. 4 is a top view of an exemplary embodiment of the chopping board showing a pair of female interconnectable hinge portions for interconnection with the male hinge portions of the second case member.

FIG. 5 is a top view of the second case member with the cutting board secured in place with the interconnectable hinge portions and the spring loaded pins.

FIG. 6 is a top view of the carrying case with the first and second case members pivoted into the closed position and one of the latching mechanism engaged and the other latching mechanism in the unengaged position.

EXEMPLARY MODE FOR CARRYING OUT THE INVENTION

FIG. 1 shows an exemplary embodiment of the carrying case of the camping kitchen caddy of the present invention generally designated by the numeral 10. Carrying case 10 includes a first case member 12 and a second case member 14. First case member 12 and second case member 14 are hingedly interconnected by a pair of user engageable hinge mechanisms, generally designated by the numerals 16a, 16b.

First case member 12 is shown in isolation in FIG. 2. First case member 12 includes a molded plastic housing 18, a handle 20, a pair of male hinge portions 22a, 22b, and a pair of latch posts 24a, 24b that form a portion of the latching mechanism used to latch first and second case members 12, 14 together in the carrying configuration. Plastic housing 18 forms a form fitting frying pan receiving compartment 26, a condiment receiving compartment 28, a coffee mug receiving compartment 30, a drinking glass receiving compartment 32, a carving knife receiving compartment 34, a skewer receiving compartment 36, and three eating utensil compartments 38, 40, 42. In this exemplary embodiment the camping kitchen caddy is supplied with a variety of items including a frying pan 44, six coffee mugs 46 (one removed to show mug handle compartment 47), six drinking glasses 48, a carving knife 50, six spoons 52, six forks 54, six knives 56, a selection of condiments and coffee supplies 58, and six shish kabob skewers 60.

Second case member 14 is shown in isolation in FIG. 3. Second case member 14 includes a molded plastic housing 62; a pair of female hinge portions 64a, 64b; a pair of latch pivots 66a, 66b; a pair of male chopping board hinge portions 68a, 68b; and a pair of spring loaded, pivoting chopping board retaining pins 70a, 70b. Plastic housing 62 forms a form fitting coffee pot receiving compartment 72, a wash compartment 74 that doubles as a bowl storage compartment, a rinse compartment 76 that doubles as a dish storage compartment, a cleaning supply storage compartment 78 and a miscellaneous cooking utensil storage compartment 80. In this exemplary embodiment the camping kitchen caddy is also supplied with a coffee pot 82, six bowls 84, six plates 86, a supply of dish washing liquid 88, a sponge 90, a scrubber 92, and a variety of cooking and serving utensils including a basting brush 94, a pair of bar-b-que tongs 96, a pair of salad tongs 98, a ladle 100, a slotted spoon 102, a carving fork 104, a can/bottle opener 106 and a spatula 108. FIG. 3A shows second case member 14 with all the items removed from the various compartments to more clearly show wash compartment 74 and rinse compartment 76.

FIG. 4 shows an exemplary embodiment of the nylon chopping board 110 including a pair of female chopping board hinge portions 112a, 112b. As shown in FIG. 5, female hinge portions 112a, 112b pivotally interconnect with male hinge portions 68a, 68b to partially connect chopping board 110 to second case member 14. The connection is completed by rotating chopping board retaining pins 70a, 70b into its respective retaining pin cavity 114a, 114b, positioning chopping board 110 underneath retaining pins 70a, 70b and releasing pins 70a, 70b to rotate out of cavities 114a, 114b trapping chopping board 110 over second case member 14.

FIG. 6 is a top view of carrying case 10 showing the first and second case members 12, 14 pivoted into the closed position and one of the latch pivots 66b engaged with latch post 24b (not shown) and the other latch pivot 66a unengaged with latch post 24a.

Use of the exemplary camping kitchen caddy is now described with general reference to FIGS. 1–6. The variety of cooking, eating, and cleaning items are transported to and from the picnic or camping site by folding carrying case 10 into the folded configuration and carrying the case with handle 20. Upon arrival at the site, the various items may be utilized as desired by simply opening the case and removing chopping board 110. If desired, second case member 14 may be utilized as a dish washing station by removing all the items from the various compartments, filling washing compartment 74 with washing detergent and water and rinsing compartment 74 with clean water. Rinsing compartment 76 is larger in this embodiment to allow the washed items to be emersed under the water within the rinse compartment. Once all the items to be washed have been washed and rinsed, wahing and rinse compartments 74, 76 may be emptied and dried, the items reinserted into their respective compartments and the carrying case 10 closed for transportation back to the users home or auto. Because of its plastic construction, the camping kitchen caddy may be stored in the trunk of an auto for emergencies or impromptu picnics.

It can be seen from the preceding description that a camper kitchen caddy has been provided that includes a variety of storage and transportation compartments for a variety of specific cooking, eating and cleaning utensils; that includes a compartment for storing and transporting a number of coffee mugs that includes provisions for protecting the handles of the mugs from breakage; that is easily stored in a trunk of an automobile when not in use; and that includes a variety of the most commonly desired eating, cooking and cleaning utensils used while camping or picnicking.

It is noted that the embodiment of the camper kitchen caddy described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A camper kitchen caddy comprising:

a carrying case having first and second pivotally connectable case members, said first case member having a pair of male chopping board hinge portions and a pair of spring loaded, pivoting chopping board retaining pins that are each positionable respectively within one of pair retaining pin cavities formed within said first case member; and a pivotally connectable chopping board surface securable to said first case members, said chopping board surface including a pair of female hinge portions pivotally connectable with said pair of male chopping board hinge portions;

said carrying case including a suit case type handle, a pair of latching mechanism for securing said first and second case members into a closed suitcase type configuration, and a coffee mug receiving compartment including a first concave portion sized sufficiently to receive a drinking vessel portion of a coffee mug and a number of handle receiving concave portions, formed in a bottom surface of and spaced along a length of said first concave portion, that are each sized sufficiently to receive a handle of one of said coffee mugs; said chopping board retaining pins being biased in a manner to extend from said retain pin cavities and entrap said chopping board surface beneath said retaining pins.

2. The camper kitchen caddy of claim 1, wherein:

said first and second case members are molded from a plastic material and each case member includes at least one compartment form fitted to receive and hold a particular type item, and a number of other compartments for receiving a variety of user selected items.

3. The camper kitchen caddy of claim 1, wherein:

said carrying case includes a compartment form fitted to receive a frying pan and a compartment form fitted to receive a coffee pot.

\* \* \* \* \*